(12) United States Patent
Hu et al.

(10) Patent No.: US 11,280,621 B2
(45) Date of Patent: Mar. 22, 2022

(54) NAVIGATION USING A DEVICE WITHOUT GLOBAL POSITIONING SYSTEM ASSISTANCE

(71) Applicant: INTERNATIONAL BUSINESS MACHINES CORPORATION, Armonk, NY (US)

(72) Inventors: Yan Nan Hu, Beijing (CN); You Jing, Beijing (CN); Hui Wang, Beijing (CN); Jun Li Wang, Beijing (CN); Zhao Fei, Beijing (CN)

(73) Assignee: International Business Machines Corporation, Armonk, NY (US)

(*) Notice: Subject to any disclaimer, the term of this patent is extended or adjusted under 35 U.S.C. 154(b) by 195 days.

(21) Appl. No.: 16/240,288

(22) Filed: Jan. 4, 2019

(65) Prior Publication Data

US 2020/0217669 A1 Jul. 9, 2020

(51) Int. Cl.
*G01C 21/32* (2006.01)
*G06F 16/29* (2019.01)

(52) U.S. Cl.
CPC ............ *G01C 21/32* (2013.01); *G06F 16/29* (2019.01)

(58) Field of Classification Search
CPC ........ G01C 21/32; G01C 21/34; G01C 21/20; G01C 21/24; G01C 21/38; G01C 23/00; G01C 21/165; G01C 21/16; G01C 21/30; G06F 16/29; G06F 16/387; G01D 1/027; G08G 5/065; B60K 2370/166
See application file for complete search history.

(56) References Cited

U.S. PATENT DOCUMENTS 8,386,171 B2 2/2013 Park
8,620,532 B2 * 12/2013 Curtis .................. G01C 21/00
701/50

(Continued)

FOREIGN PATENT DOCUMENTS

CN 105427651 A 3/2016
CN 103942973 A 7/2017
WO 2017/095207 A1 6/2017

OTHER PUBLICATIONS

Trein, G. et al., "Simple approach for indoor mapping using low-cost accelerometer and gyroscope sensors" University of Toronto (2013) pp. 1-5.

(Continued)

*Primary Examiner* — Ig T An
(74) *Attorney, Agent, or Firm* — Tutunjian & Bitetto, P.C.; Michael A. Petrocelli

(57) ABSTRACT

A navigation method that includes building a virtual map database of maps for structures that block GPS signals, wherein the virtual maps are created from speed and direction measurements taken from motion sensors of the mobile devices of users of a geographic information system (GIS) map server; and starting a navigation session by a user employing a navigation application that employs the GIS map server. The GIS map server includes GIS map data, and virtual map data from the virtual map database. The virtual map data is for navigation instructions without a GPS signal. A start location is set using the GIS map data to provide the initial start location; and directions are provided to the start location using a virtual map data from the virtual map database.

20 Claims, 9 Drawing Sheets

(56) References Cited

U.S. PATENT DOCUMENTS

| | | | | |
|---|---|---|---|---|
| 8,744,749 B2* | 6/2014 | Gupta | .................. | H04W 4/024 |
| | | | | 701/408 |
| 9,196,161 B2 | 11/2015 | Lai et al. | | |
| 2003/0191568 A1* | 10/2003 | Breed | .................. | B60W 40/06 |
| | | | | 701/36 |
| 2008/0042844 A1* | 2/2008 | Christopher | ........... | A62B 99/00 |
| | | | | 340/572.4 |
| 2012/0046860 A1* | 2/2012 | Curtis | .................. | G01C 21/34 |
| | | | | 701/418 |
| 2015/0087264 A1* | 3/2015 | Goyal | .................... | G01S 19/34 |
| | | | | 455/411 |
| 2016/0146616 A1* | 5/2016 | Ren | ...................... | G01C 21/165 |
| | | | | 701/409 |
| 2016/0189416 A1* | 6/2016 | Naguib | .................. | H04W 4/02 |
| | | | | 345/441 |
| 2016/0282129 A1* | 9/2016 | Wang | .................... | H04W 24/08 |
| 2016/0379388 A1* | 12/2016 | Rasco | .................... | G06N 5/003 |
| | | | | 715/753 |
| 2017/0059328 A1* | 3/2017 | Dousse | .................. | G01C 21/32 |
| 2017/0078851 A1* | 3/2017 | Agrawal | ............... | H04W 4/021 |
| 2018/0352376 A1* | 12/2018 | Shuman | .................. | H04W 4/40 |
| 2019/0063947 A1* | 2/2019 | Beaurepaire | ....... | G01C 21/3685 |
| 2019/0301883 A1* | 10/2019 | Xia | ........................ | G01C 21/32 |
| 2019/0342698 A1* | 11/2019 | Cao | ........................ | G06Q 50/30 |

OTHER PUBLICATIONS

Pipelidis, G. et al., "Dynamic Vertical Mapping with Crowdsourced Smartphone Sensor Data" Sensors (Feb. 2018) pp. 1-25, vol. 18, No. 480.

Zhou, B. et al., "A Robust Crowdsourcing-Based Indoor Localization System" Sensors (Apr. 2017) pp. 1-16, vol. 17.

Welch, C., "Google turns to crowdsourcing for indoor maps initiative" https://www.theverge.com/2012/4/6/2929604/google-indoor-maps-floor-plan-marker-crowdsource (Apr. 2012) pp. 1-2.

* cited by examiner

NAVIGATION USING A DEVICE WITHOUT GLOBAL POSITIONING SYSTEM ASSISTANCE

BACKGROUND

Technical Field

The present invention generally relates to navigation systems, and more particularly to applications for aiding navigation systems when the GPS signal is weak or not available.

Description of the Related Art

People utilize navigation applications on mobile devices, e.g., when driving. In general, navigation applications are based on online or offline maps provided by navigation companies and a real-time global positioning system (GPS) signal. Navigation apps can plan paths between a starting point and a destination for drivers.

SUMMARY

In accordance with an embodiment of the present invention, a method of navigation is provided that employs virtual maps to supplement navigation directions when the navigation application being employed by the user fails to receive a GPS signal. In one embodiment, the method includes building a virtual map database of maps for structures that block GPS signals, wherein the virtual maps are created from speed and direction measurements taken from motion sensors of the mobile devices of users of a geographic information system (GIS) map server. Starting a navigation session by a user employing a navigation application that employs the GIS map server, wherein the GIS map server includes GIS map data and a virtual map data from the virtual map database, wherein the virtual map data is for navigation instructions without a GPS signal. Setting a start location using the GIS map data to provide the initial start location. Measuring a decrease in GPS signal strength correlated to positioning of the user in an underground location. Providing directions to the start location using the virtual map data.

In another aspect, a system is provided for providing navigation directions that employs virtual maps to supplement navigation directions when the navigation application being employed by the user fails to receive a GPS signal. In one embodiment, the system includes a GPS signal transceiver for receiving GPS signals. The system further includes a map server including a geographic information system (GIS) map database that provides map data for directions responsive to a GPS signal; and the map server includes a virtual map database of map data for structures that block GPS signals. The virtual maps are created from speed and direction measurements taken from motion sensors of the mobile devices of users of a geographic information system (GIS) map server. The system further includes a navigation application including at least one hardware processor for executing directions stored on memory, the directions executed by the navigation application including calling for a GPS signal in response to a user of the navigation application opening a navigation session, selecting map data from the GIS map database in response to receiving said GPS signal or selecting map data from the virtual map database in response to not receiving said GPS signal in response to the calling. The navigation application provides directions derived from map data from at least one of the GIS map database and the virtual map database to a start location on a display of a mobile device of the user calling for the GPS signal.

In another aspect, the present disclosure provides a computer program product comprising a computer readable storage medium having computer readable program code embodied therein for a method of navigation that employs virtual maps to supplement navigation directions when the navigation application being employed by the user fails to receive a GPS signal. In some embodiments, the computer readable storage medium may be non-transitory. The method actuated by the computer program product may include building a virtual map database of maps for structures that block GPS signals, wherein the virtual maps are created from speed and direction measurements taken from motion sensors of the mobile devices of users of a geographic information system (GIS) map server. Starting a navigation session by a user employing a navigation application that employs the GIS map server, wherein the GIS map server includes GIS map data and virtual map data from the virtual map database, the virtual map data for navigation instructions without the GPS signal. Setting a start location using GIS map data to provide the initial start location. Providing directions to the start location using the virtual map data.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
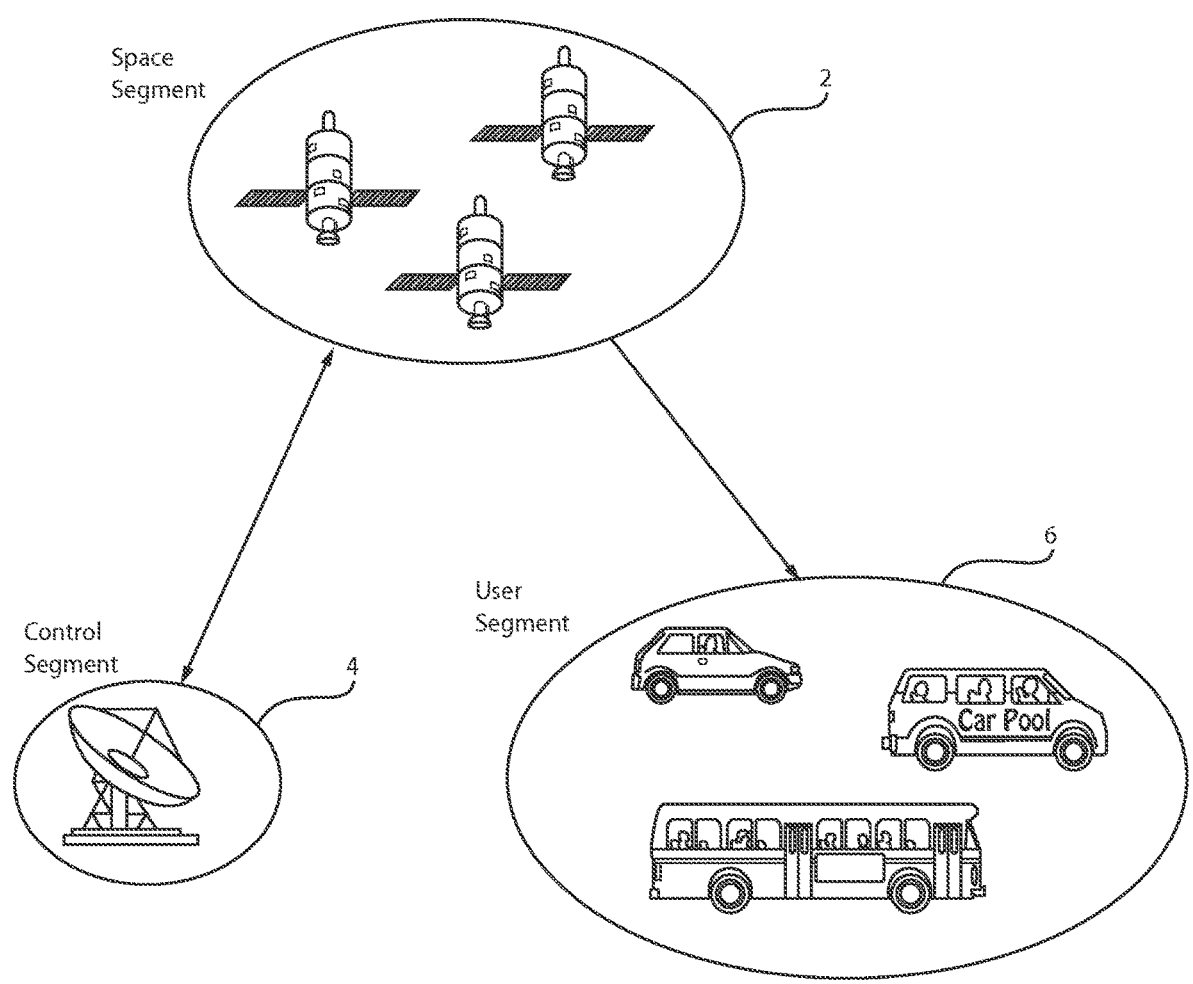
FIG. 1 is a general illustration of the various segments in a GPS system, as used in some embodiments of the present disclosure.

In some embodiments, the disclosure provides methods, systems and computer program products that provide navigation without the need for maps and/or global positioning systems (GPS) when in an underground location, such as a garage of a building. It has been determined that navigation applications have difficulty when employed by a user at an underground location is because, when starting from a 'current location' that is underground, e.g., beneath a building, the GPS signal can not reach the navigation application being employed by the user. Because the GPS signal is lost underground, in order for the navigation application to provide directions, the application randomly selects a starting point near the underground location at which the user starts their navigation experience. This random selection for the start location is not necessarily the exit of the underground location, e.g., underground parking lot, at which the user has started their navigation experience. This can make it difficult for the user of the navigation application, also referred to as a driver, to identify which direction to go at the start of the navigation experience, when the navigation application picks a random selection for the start of the directions. For example, the driver may not know what direction to go when leaving an underground location, i.e., when they reach an exit, the driver may not know whether to make a left or a right when reaching the exit to head towards the randomly selected start location. Additionally, because most navigation applications do not have parking lot maps, drivers can get lost when finding the exit. What's worse, when a parking lot has more than one exit, drivers may reach out to an exit that is far from the destination, leading to potential detour.

With the aforementioned problems in mind, it has been determined that when navigating from a spot that has no GPS signal, it is likely that the starting point is a parking lot, especially when there are building in the area of the navigation session. However, navigation applications do not include maps and starting locations representative of parking lots. There exists a lack of mappings between the underground parking lot maps and the road maps. In other words, if the navigation applications had mapping technologies for underground locations, and also have a method to identify starting location for a navigation session without GPS, the navigation applications could provide a better experience to the user.

In some embodiments, the methods, system and computer program products described herein provides a navigation system that can construct virtualized maps and realize mapping/linking between virtualized maps and maps in reality so that the navigation to the driver is available all the time. In some embodiments, the methods, systems and computer program products provide navigation systems that can infer the starting point when GPS signal is bad. For example, in one embodiment, the systems and methods can infer the 'current location' to be an underground lot according to the destination of the last navigation. In some embodiments, the systems may ask the user to confirm a current location that has been suggested by the system in a confirmation step. In some embodiments, the methods, systems and computer program products can employ a gyroscope that is integrated within a mobile device to detect direction and speed of the travel, i.e., the driving direction and speed of the user. Data from different users can be uploaded to a central service, which may be referred to as a backend map processing system. In some embodiments, using the backend map processing system, the navigation system can construct a virtual map based on big data from the different users. The navigation system of the mobile device can download the virtual map from a remote map database. The navigation system can supplement navigation directions with the virtual map when the global positioning signal for the GPS system is not available. In some embodiments, of the methods, systems and computer program products of the present disclosure, can switch between the mapping that employs the GPS signal, and the virtual map that does not include the GPS single. So with above methods, if a vehicle entering a building and lost GPS signal, the mobile device can switching to navigate using the combination mode by downloading the constructed virtual map (from uploaded data) and real Geographic Information System (GIS) map (predefined). The systems, methods and computer program products are now described with more detail with reference to FIGS. 1-10.

FIG. 1 is a diagram illustrating an example GPS environment that can be used with the systems, methods and computer program products described herein, which can add a GIS backend map server to navigation applications employing the GPS environment. GPS, such as NAVSTAR GPS, consists of three major segments: Space, Control, and User, as illustrated in FIG. 1. The space segment 2 consists of a nominal constellation of 24 operational satellites which have been placed in 6 orbital planes above the Earth's surface. The satellites are in circular orbits in an orientation which normally provides a GPS user with a minimum of five satellites in view from any point on Earth at any one time. The satellites broadcast an RF signal which is modulated by a precise ranging signal and a coarse acquisition code ranging signal to provide navigation data.

This navigation data, which is computed and controlled by the GPS control segment 4, includes the satellite's time, its clock correction and ephemeris parameters, almanacs, and health status for all GPS satellites. From this information, the user computes the satellite's precise position and clock offset.

The control segment consists of a Master Control Station and a number of monitor stations at various locations around the world. Each monitor station tracks all the GPS satellites in view and passes the signal measurement data back to the master control station. There, computations are performed to determine precise satellite ephemeris and satellite clock errors. The master control station generates the upload of user navigation data from each satellite. This data is subsequently rebroadcast by the satellite as part of its navigation data message.

The user segment 6 is the collection of all GPS receivers and their application support equipment such as antennas and processors. This equipment allows users to receive, decode, and process the information necessary to obtain accurate position, velocity and timing measurements. This data is used by the receiver's support equipment for specific application requirements. GPS supports a wide variety of applications including navigation, surveying, and time transfer.

GPS receivers, as used in navigation applications, may be used in a standalone mode or integrated with other systems. In some embodiments, land-based navigation systems use vehicle speed sensor, rate gyro and a reverse gear hookup to "dead reckon" the vehicle position from a previously known position. This method of dead reckoning, however, is susceptible to sensor error, and therefore requires more expensive sensors for accuracy and dependability.

GPS has been used as a position back-up in use for land-based applications, in which position propagation is computed by "dead reckoning" using speed and heading. In determining the propagation of position, however, these systems are susceptible to the errors inherent in the reported.

GPS position and the errors in the dead reckoning calculation using speed and heading. Additionally, prior systems use a road network stored in a map database to calculate current vehicle positions. These systems send distance and heading information to perform map matching, and map matching calculates the current position based on the road network and the inputted data. These systems also use map matching to calibrate sensors. Map matching, however, has inherent inaccuracies because map matching must look back in time and match data to a location. As such, map matching can only calibrate the sensors when an absolute position is identified on the map, but in instances in which a navigation application begins from an underground location, such as a parking garage, sensor calibration using map matching may not occur for a significant period of time.

The systems, methods, and computer program products of the present disclosure overcome the difficulties of loosing a GPS signal by employing virtual maps to supplement the navigation applications when the navigation when the navigation application being employed by the user fails to receive a GPS signal. The virtual maps can be of underground facilities, such as parking garage, and this information may be provide by the pool of users employing the navigation systems themselves. The pool of users, i.e., a big data application of users, run the navigation application from mobile devices, which can measure the virtual maps using integral sensors. The mobile devices can upload the maps that they record in real time.

The systems, methods, and computer program products of the present disclosure can infer the starting point when GPS signal is bad. For example, but not limited to, the systems can infer the 'current location' to be a underground lot according to the destination of the mobile device that is running the navigation application. In some examples, the mobile device detects the fading out of the GPS signals to detect the entry point of the user into an underground facility, such as a parking garage, and the fading-in of the GPS signals for the exit location, i.e., leaving an underground facility, such as a parking garage. The mobile device can keep uploading the data of the current location of the drive in a timely manner to the backend map processing system, then the map processing system can construct a virtual map based on big data from different users the navigation system on the mobile device can download the virtual map from the remote map database when there is no GPS signal. In some embodiments, the virtual map can be matched with the map in reality by matching the entry point and exit point.

In some preferred embodiments, the methods, systems and computer program products infer the current location of a user of the GPS navigation application based on data from gyroscope and uploaded location data and path to the backend map server, e.g., GIS backend map server. In some examples, the backend map server generates the path based on location data and generates the virtual map on server side. The mobile device, i.e., the device running the navigation application, detects the entry point and automatically switching the navigation mode by detecting GPS signal loss. The systems, methods and computer program products of the present disclosure can also detect the exit point and automatically switch the navigation mode to real map by detecting the GPS signal strength.

Figure 2:
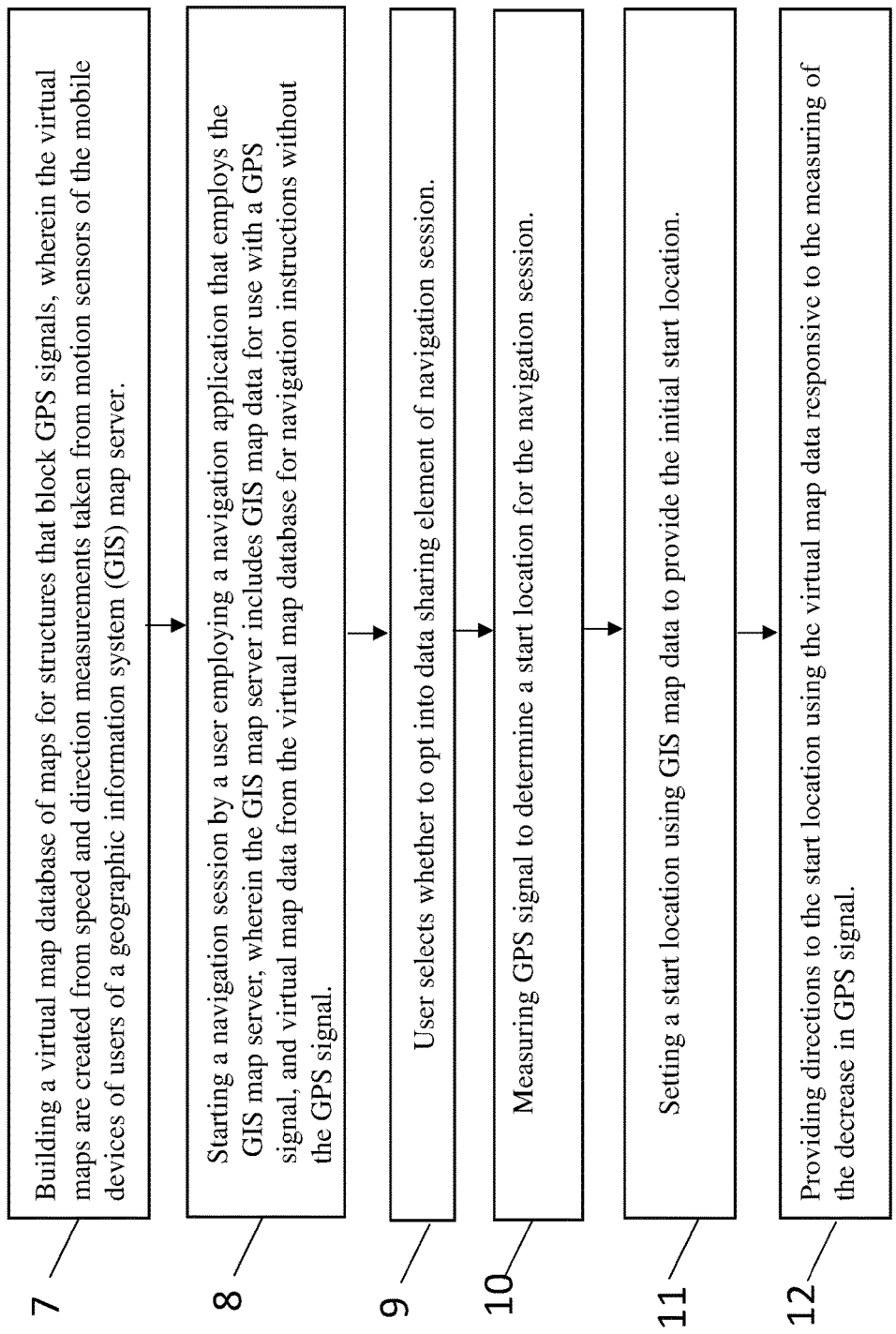
FIG. 2 shows a block/flow diagram of a method of navigation that employs virtual maps to supplement navigation when the navigation application being employed by the user fails to receive a GPS signal.

FIG. 2 shows a block/flow diagram of one embodiment of a method of navigation that employs virtual maps to supplement navigation when the navigation application being employed by the user fails to receive a GPS signal. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
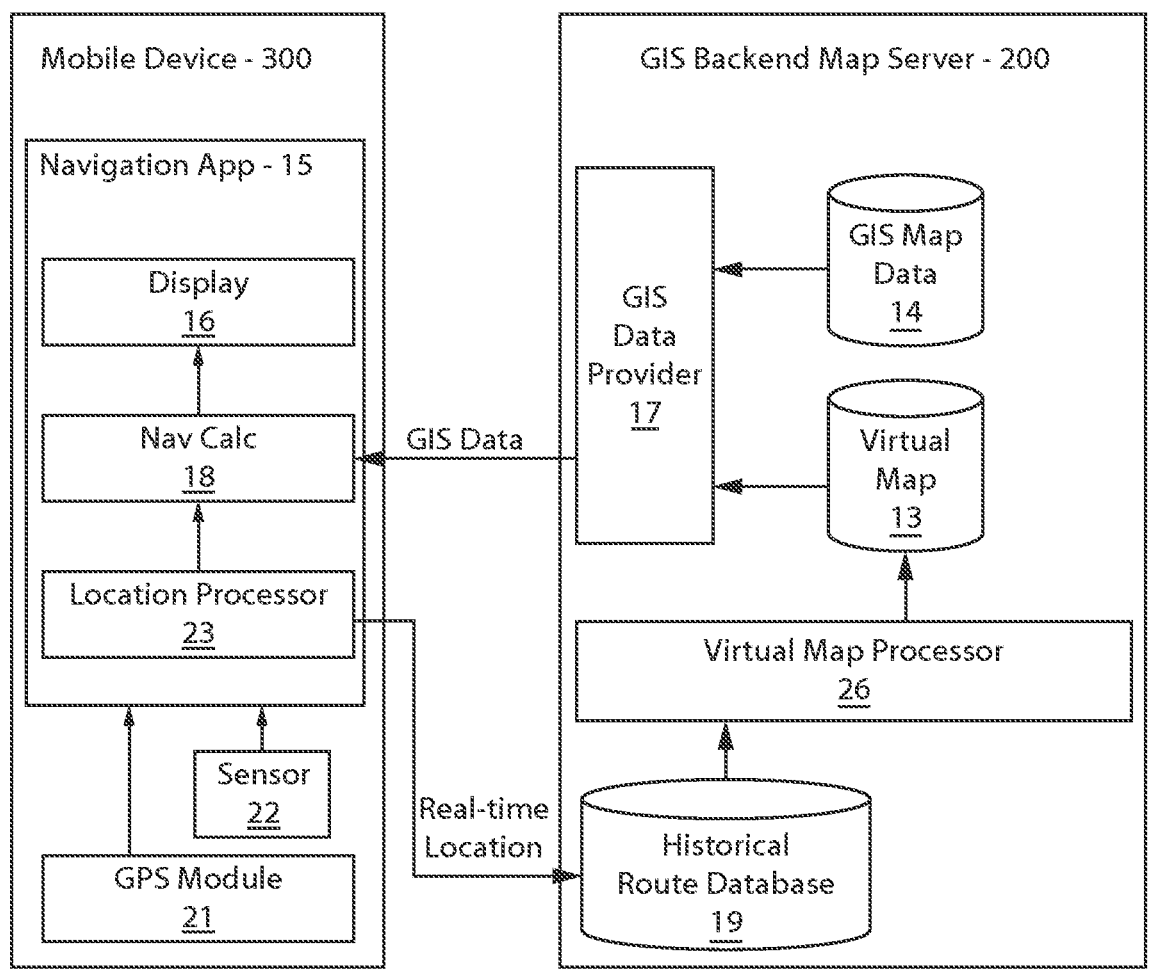
FIG. 3 is a block diagram illustrating one embodiment of a system that employs virtual maps to supplement navigation directions when the navigation application being employed by the user fails to receive a GPS signal, as described in method illustrated in FIG. 2.

In one embodiment, the method depicted in FIG. 2 may be a computer implemented method of navigation that can begin at block 7 with building a virtual map database 13 of maps for structures that block GPS signals. The virtual maps, i.e., of the virtual map database 13, are created from speed and direction measurements taken from motion sensors of the mobile devices 300 of users of a geographic information system (GIS) map server 200. FIG. 3 is a block diagram illustrating one embodiment of a system 350 that employs virtual maps from a virtual map database 13 to supplement navigation directions when the navigation application 15 being employed by the user fails to receive a GPS signal, e.g., signal from the GPS module 21, as described in method illustrated in FIG. 2.

FIG. 3 illustrates one example of a geographic information system (GIS) map server 200 that includes a backend map system including both general map data, e.g., geographic information system (GIS) maps in a GIS map data database 14, and virtual map data, e.g., virtual maps in the virtual map database 13, that can collect real time location data from the mobile devices 300 that are being employed to run the navigation application 15. To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual, i.e., user 15, to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information. The opt-in status can be changed at any time by the user.

The geographic information system (GIS) map server 200 provides map data to the mobile device 300, the map data including both virtual map data from the virtual map database 13, and general map data from the GIS map data server 14. This function may be provided by the GIS data provider 17 of the geographic information system (GIS) map server 200, which is in communication with the navigator director calculator 18 of the navigation application 15 being run on the mobile device 300. The GIS map server 200 may also include a historical route database 19 and virtual map processor 20. These elements of the GIS map server 200 receive real time location inputs from the mobile device 300, which in turn function with the virtual map 13 to provide mapping data back to the navigator director calculator 18 of the navigation application 15 being run on the mobile device 300.

Still referring to FIG. 3, the mobile device 300 on which the navigation application 15 may be executed may be carried by a person, i.e., person mounted, or may be a component of a motor vehicle. In some examples, the mobile device 300 can be a laptop/notebook computer or sub-notebook computer; a tablet or phablet computer; a mobile phone or smartphone; a personal digital assistant (PDA); a portable media player (PMP); a cellular handset; a handheld gaming device; a gaming platform; a wearable or otherwise body-borne computing device, such as a smartwatch, smart glasses, or smart headgear; and/or a combination of any one or more thereof. In some embodiments, the mobile device 300 may include a display 16, i.e., map render. The display 16 can be any electronic visual display or other device configured to display or otherwise generate an image (e.g., image, video, text, and/or other displayable content) therefrom. In some embodiments, the display 16 can be a touchscreen display or other touch-sensitive display that can utilize any of a wide range of touch-sensing techniques, such as, for example: resistive touch-sensing; capacitive touch-sensing; surface acoustic wave (SAW) touch-sensing; infrared (IR) touch-sensing; optical imaging touch-sensing; and/or a combination of any one or more thereof. The display 16 depicts the route directions calculated by the navigator director calculator 18, which is in communication with the GIS data provider of the GIS map server 200.

The mobile device 300 may include a GPS module 21 for receiving a GPS signal. GPS signals include ranging signals, used to measure the distance to the satellite, and navigation messages. The navigation messages include ephemeris data, used to calculate the position of each satellite in orbit, and information about the time and status of the entire satellite constellation, called the almanac. There are four signals available for civilian use. In order of date of introduction, these are: L1 C/A, L2C, L5 and L1C. The GPS module 21 is a transreceiver or receiver that can receive any of the aforementioned signal variations. The GPS module 21 can provide location information of the user that can be transmitted to the navigation application 15 of the mobile device 300.

The mobile device 300 may also include a motion sensor 23. The motion sensor 23 that senses the motion of the user, i.e., the person receiving directions thought the navigation application 15, may be at least one of a gyroscopic sensor (also referred to as gyro sensor), accelerometer, gravitational sensors and combinations thereof. Gyroscopic sensors are sensors that are configured to measure the rotation of a mobile computing device 300. An accelerometer is a sensor that is configured to acceleration applied to the mobile computing device 300. Gravitational sensors are sensors configured to measure gravitational forces acting upon the mobile computing device 300. The motion sensor 23, e.g., gyroscope, can provide the direction and speed of the user, i.e., the person receiving directions through the navigation application 15.

Referring to FIG. 3, the mobile device 300 further includes a software system which can be connected with the back end map system 200 to upload location information, and download virtual map information. For example, the GPS location may be received by the GPS module 21 and provided to the navigation lab. The location processor 23 of the navigation application 15 for the mobile device 300 can provide real time location updates to the GIS map server 200.

The system 350 that employs virtual maps from a virtual map database 13 to supplement navigation directions when the navigation application 15 being employed can function in the preparation of the virtual maps. The virtual maps are always updating. One example of forming the virtual maps, i.e., the map data containing in the virtual map database 13, can be illustrated by review of FIGS. 4-7.

Figure 4:
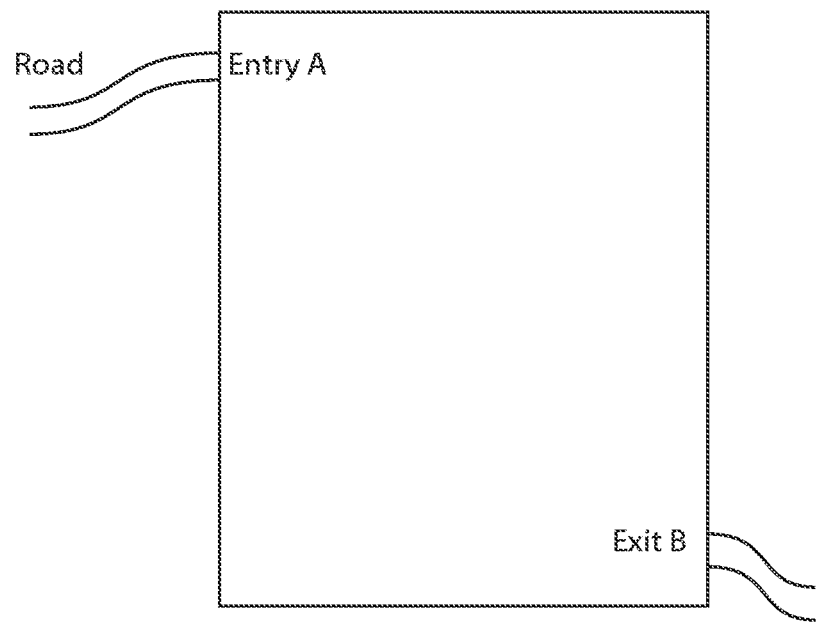
FIG. 4 is an illustration of a map of an underground park based on Geographic Information System (GIS) map systems, in accordance with one embodiment of the present disclosure.

FIG. 4 is an illustration of a map of an underground park based on Geographic Information System (GIS) map systems. FIG. 4 is an example of the type of map that can be received form the GIS map data 14. In this example, the GIS map data 14 can include entry information from the general street to an entrance, i.e., entry A, and an exit, e.g., Entry B. The GIS map data 14 can also include the exterior dimensions. However, the building depicted in the map illustrated in FIG. 4 is an underground building and the GIS map data 14 does not provide any details of the internal passageways and roadways and driveways within the building. To provide that type of data, the GIS backend map server 200 provides a virtual map. The virtual map is provided by statistical analysis, historical data and use of comparative design features.

Figure 5:
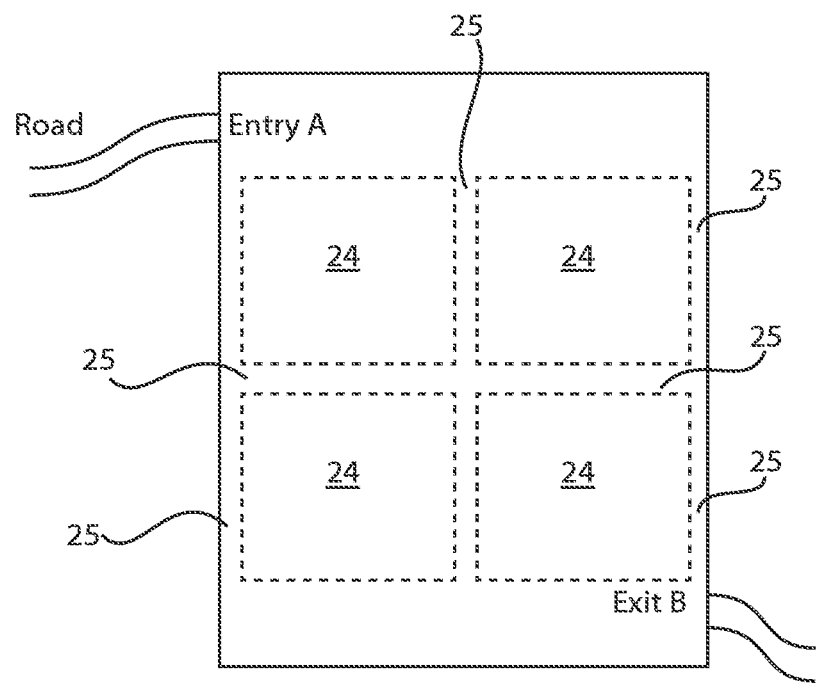
FIG. 5 is an illustration of the internal shape, i.e., parking positions and internal roads, for the underground park depicted in FIG. 4.

FIG. 5 is an illustration of the internal shape, i.e., parking positions and internal roads, for the underground park depicted in FIG. 4. Determining the internal shape of the underground building can be the first step is preparing a virtual map. In one examples, because the exterior dimensions are known from the GIS map data 14, assumptions can be made regarding the general layout of the interior for the underground building. For example, when the user enters ENTRY A, the user entering a below ground building starts to loose GPS signal. From the historical route database 19, it may be determined that the type of building is a garage. From those assumption, as well as the knowledge regarding the exact location of the exits, and the location of the building, the virtual map processor 20 can estimate the location of the parking locations within the underground building. The parking spaces are identified by reference number 24 and the internal roads are identified by reference number 25. The virtual map processor 20 may employ at least one hardware processor and at least one type of memory, the memory storing a plurality of instructions steps including machine learning and artificial intelligence, e.g., artificial neural networks, for the virtual map processor to estimate the location of parking locations and driveway locations, as depicted in FIG. 5.

Figure 6:
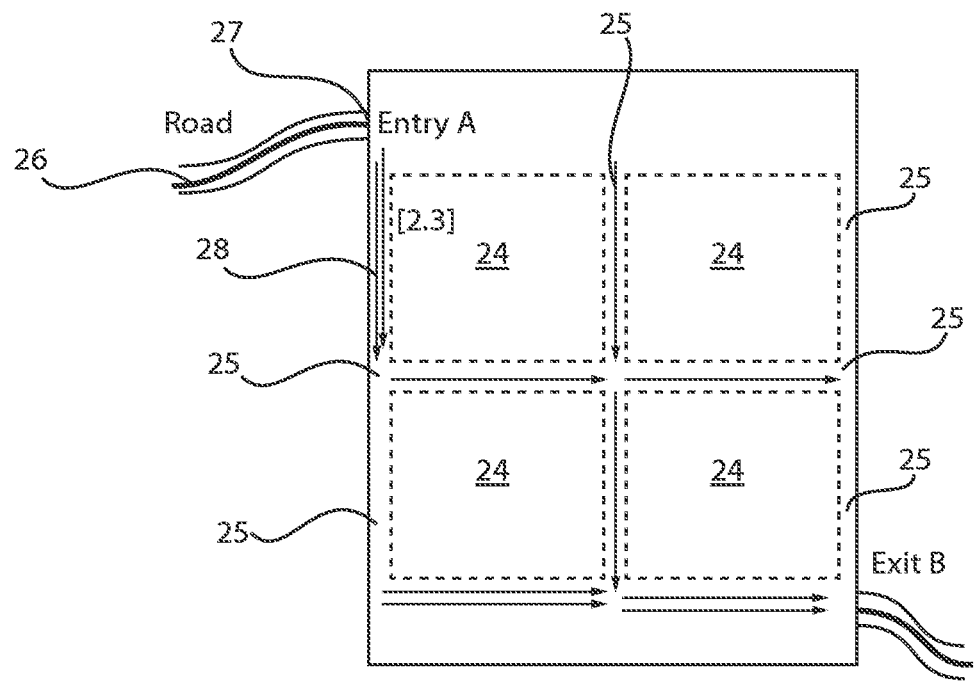
FIG. 6 is an illustration of the path of vehicles on the underground parking lot that is depicted in FIG. 5.

FIG. 6 further illustrates some of steps taken by the virtual map processor 20 to build a virtual map based on historical data, i.e., from the historical route database 19. FIG. 6 illustrates the driver pathways being placed onto the map, i.e., the internal roads 25 between the parking spaces 24. In FIG. 6, at point 26 of entry A to the underground building, the vehicle, e.g., user, with the mobile device 300 having the navigation application 15 functioning thereon is working with a fully received GPS signal. At point 27 of entry A to the underground building, the vehicle is going underground, and the navigation application 15 can detect that the GPS signal is getting worse until eventually disappearing. At this state, the location processor 23 sends a signal to the backend map server 200, which switches the navigation means to virtual map mode. At this point, once the vehicle, i.e., user, is within the underground building, e.g., underground garage at point 28, the navigation application can switch to navigation application 15 will log the location, i.e. x-direction, y-direction, z-direction, and time, as measured by the motion sensors, e.g., gyroscope, of the mobile device 300, as the vehicle is traveling from entry A to exit B. In some applications, the navigation system, e.g., navigation application 15, can calculation the current location of the user in a frequency, e.g., 5 seconds, and upload that frequency at a location to the backend map server 200. From this information, i.e., frequency information, the backend map server 200 can connect the location points that have been uploaded by the mobile device 300, and log the path for the database, i.e., virtual map database 13.

Still referring to FIG. 6, as the user/vehicle is leaving the underground location, e.g., underground parking garage, at exit B, the navigation application 15 will begin to detect that the GPS signal is getting stronger, e.g., being received from a greater number of satellites. The navigation application 15 can log that point as an exit point on the virtual map.

Figure 7:
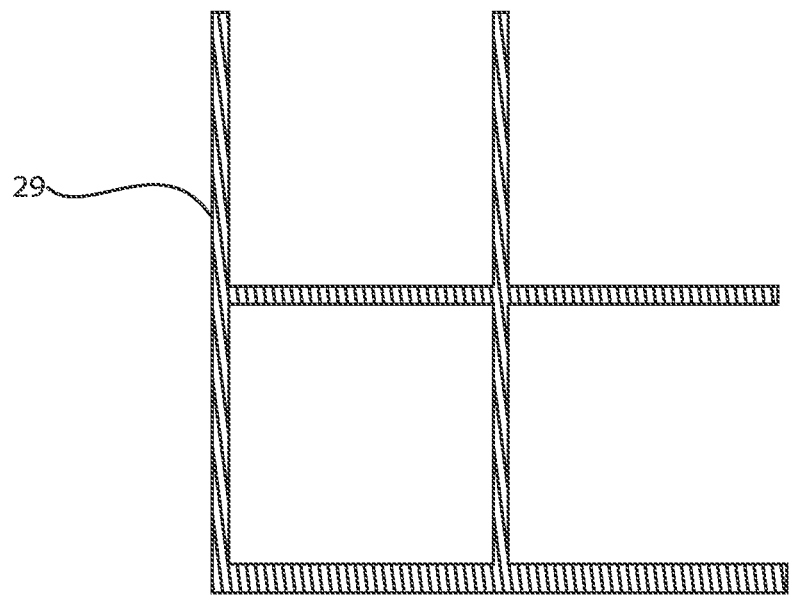
FIG. 7 is an illustration of the virtual path derived from the map depicted in FIG. 6.

FIG. 7 is an illustration of the virtual path 29 derived from the map depicted in FIG. 6, and the users recorded travels through the map depicted in FIG. 6. From the recorded data, the virtual map processor 20 generates the virtual path 29 using all the recorded points. The frequency at the recorded points can further provided for weighted sections of the virtual map. Although the path of the vehicles can be random, the virtual path 29 can be generated statistically.

Figure 8:
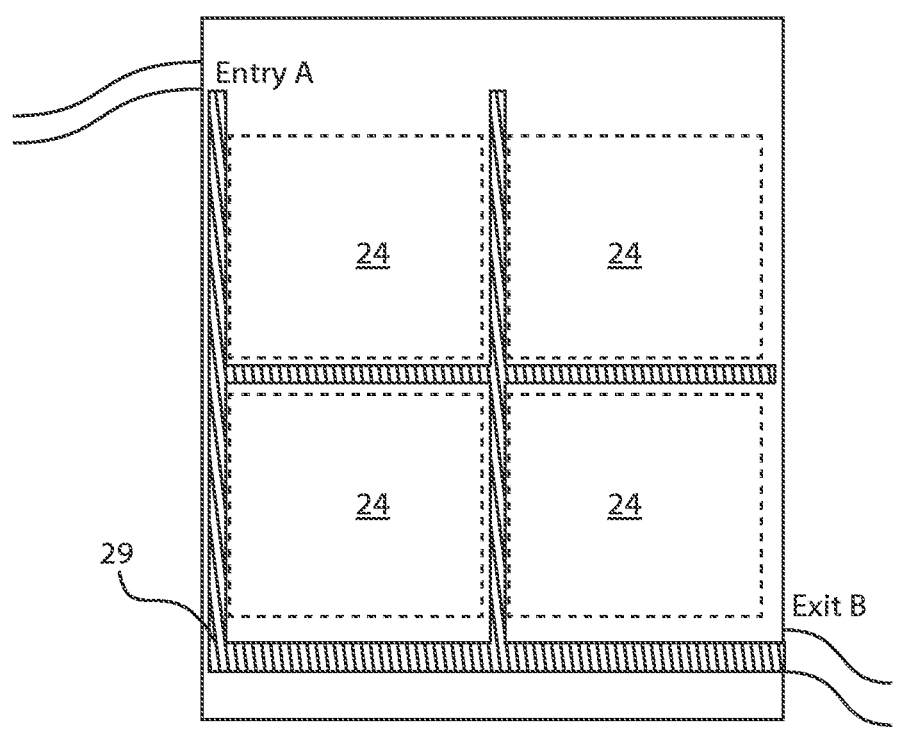
FIG. 8 is an illustration of the virtual path being projected onto the illustration of the map of an underground park based on Geographic Information System (GIS) map systems, in accordance with one embodiment of the present disclosure.

FIG. 8 is an illustration of the virtual path 29 being projected onto the illustration of the map of an underground park based on Geographic Information System (GIS) map systems to provide a virtual map, in accordance with one embodiment of the present disclosure. The backed map system can connect the real map and the virtual map by mapping the entry point, i.e., entry point A, provided by the GIS map with the entry portion of the virtual map; and by mapping the exit point, i.e., exit point B, provided by the GIS MAP with the exit point of the virtual map.

The example of forming the virtual map illustrated by FIGS. 4-7 only illustrates one example of the generation of a virtual map. Any number of virtual maps may be generated by the data produced by the users of the system depicted in FIG. 3. This is big data application. All of the virtual maps formed using this mechanism can be stored in the virtual map database 13 of the GIS backend server 200.

Referring back to FIG. 2, following the step of building a virtual map database of maps for structures that block GPS signals, the method can continue with block 8, which includes starting a navigation session by a user employing a navigation application 15 that employs the GIS map server 200 (also referred to as "GIS Blackend Server"). As noted above, the GIS map server 200 includes GIS map data 14 for use with a GPS signal, and virtual map data from the virtual map database 13 for navigation instructions without the GPS signal. To start a navigation setting, the user enters a destination address into the navigation application 15 that is run by the mobile device 300. The entry of the address starts the navigation session, which calls for a GPS signal. The GPS signal will be called by the GPS module 21 of the mobile device 300.

At block 9 of FIG. 2, the method continues with measuring the GPS signals to determine a start location for the navigation session. Generally, if a GPS signal is received by the mobile device 300 running the navigation session, the start location is set at that location. However, in the instances, in which the GPS signal that is called for by the user is not received at the GPS module 21, the start location may be arbitrarily selected to be close to the last known location of the mobile device 300. The reason why a GPS signal is not received by the GPS module 21 could include that the mobile device is blocked from receiving the GPS signal by being located at an underground location or being blocked by high rise structures. In some instances, the navigation application 15 that is run by the mobile device 300 has the option for the user to enter both the start location and the end location for the instructions.

At block 10 of FIG. 2, in the instances in which a GPS signal is not received in response to the start of a navigation session, setting a start location can include using GIS map data 14 of the GIS back end map server 200 to provide the initial start location. As noted above, the closest last known start location that can be mapped using GIS map data 14 can provide the initial start location. The initial start location provided by the GIS map data 14 can be communicated to the navigation direction calculator 18 by the GIS data provided 17. In some instances, the GIS map data 14 may provide an exit, e.g., exit B in FIGS. 4-8, to an underground structure as the start for the navigation. In this instance, it is assumed that the GPS signal is blocked, because the user is at an underground location, such as a parking garage. This scenario has been described with reference to FIGS. 4-8.

At block 11 of FIG. 2, providing directions to the start location using the virtual map data responsive to the failure to receive a GPS signal. As noted above, in some instances, the failure of the mobile device 300 to receive a GPS signal can result from the mobile device 300 running the navigation application 15 at a below ground location, e.g., an underground garage. As noted in block 10, in this instance, using the GIS map data 14 can provide a close initial start location. However, the user of the navigation application 15 now has to navigate to that initial start location. To provide for mapping to direct the user to the initial start location, a virtual data map is provided of the underground location that the user is present in. The virtual data map is provided by the virtual map database 13 of the GIS backend map server 200. As explained with reference to FIGS. 4-8, the virtual map database 13 is a collection of maps that have been created using time and motion measurements of mobile devices, i.e., the mobile devices of a plurality of users in a big data arrangement, within locations to be mapped that do not receive GPS signals, such as underground garages. As illustrated in FIGS. 7-8, a virtual path 29 measured using the above method, is mapped over a GIS map. The mapping of the virtual path 29 over the GIS map is provided by the GIS data provider 17 of the GIS backend map server 200. This provides mapping for the underground portion of the users navigation session. More specifically, the virtual path 29 provides directions to the start location on the GIS Map.

Referring to FIG. 3, in another aspect, a system 350 is provided for providing navigation directions that employs virtual maps from a virtual map database 13 to supplement navigation directions when the navigation application being employed by the user fails to receive a GPS signal, e.g., fails to receive a GPS signal at the GSP module 21. In one embodiment, the system includes a GPS signal transceiver for receiving GPS signals. The system further includes a map server (also referred to as GIS backend Map Server 200) including a geographic information system (GIS) map database 14 that provides map data for directions responsive to a GPS signal; and the map server includes a virtual map database 13 of map data for structures that block GPS signals. The virtual maps are created from speed and direction measurements taken from motion sensors 22 of the mobile devices 300 of users of navigation applications 15 employing the geographic information system (GIS) map server 200.

The system 350 further includes mobile devices 300 including navigation application 15 including at least one hardware processor for executing directions stored on memory, the directions executed by the navigation application including calling for a GPS signal, e.g., by the GPS module 21, in response to a user of the navigation application opening a navigation session, selecting map data from the GIS map database 14 in response to receiving said GPS signal 21 or selecting map data from the virtual map database 13 in response to not receiving said GPS signal 21 in response to the calling. The selection of the types of navigation maps are in response to the real time location processing of the mobile device 300, which is measured by the location processor 23 of the mobile device 300. The location processor 300 alerts in real time a historical route database 19 of the backend map server 200.

The navigation application provides directions via a navigation calculator 18 derived from map data from at least one of the GIS map database 14 and the virtual map database 13 to a start location on a display 16 of a mobile device 300 of the user calling for the GPS signal. It is noted that a further description of the system 350 depicted in FIG. 3 is provided by the description of the method in FIG. 2, as well as the description of the method for providing the virtual map database 13 with reference to FIGS. 4-8.

Figure 9:
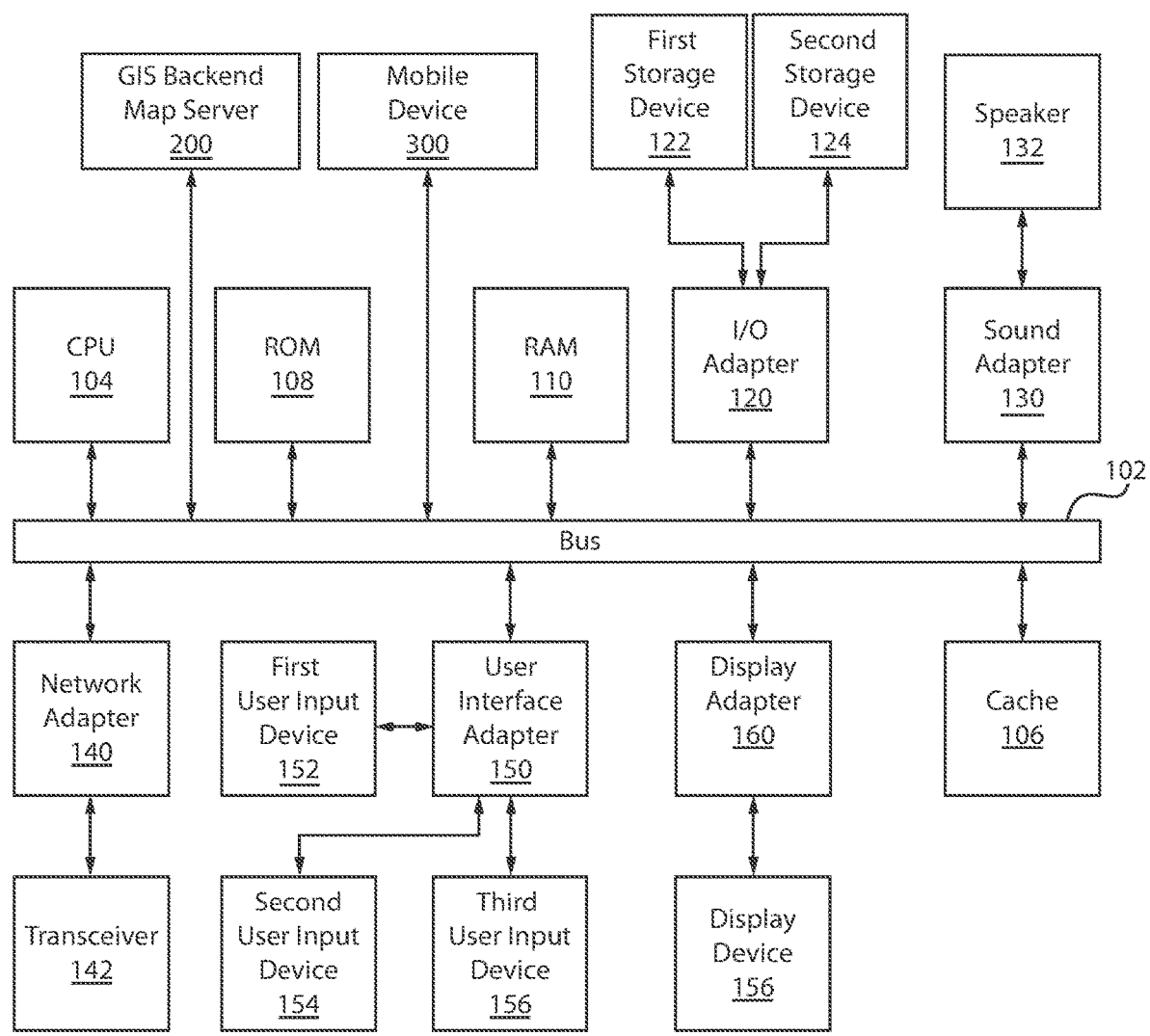
FIG. 9 is a block diagram showing a system for navigation that employs virtual maps to supplement navigation in accordance with an embodiment of the present invention.

Additionally, the navigation system 350 that is depicted in FIG. 3 may be integrated into the processing system 400 depicted in FIG. 9. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 9, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a computer readable storage medium having computer readable program code embodied herein for a method of navigation that employs virtual maps to supplement navigation directions when the navigation application being employed by the user fails to receive a GPS signal. The computer readable storage medium may be non-transitory. The method actuated by the computer program product may include building a virtual map database of maps for structures that block GPS signals, wherein the virtual maps are created from speed and direction measurements taken from motion sensors of the mobile devices of users of a geographic information system (GIS) map server. Starting a navigation session by a user employing a navigation application that employs the GIS map server, wherein the GIS map server includes GIS map data and virtual map data from the virtual map database, the virtual map data for navigation instructions without the GPS signal. Setting a start location using GIS map data to provide the initial start location. Providing directions to the start location using the virtual map data.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
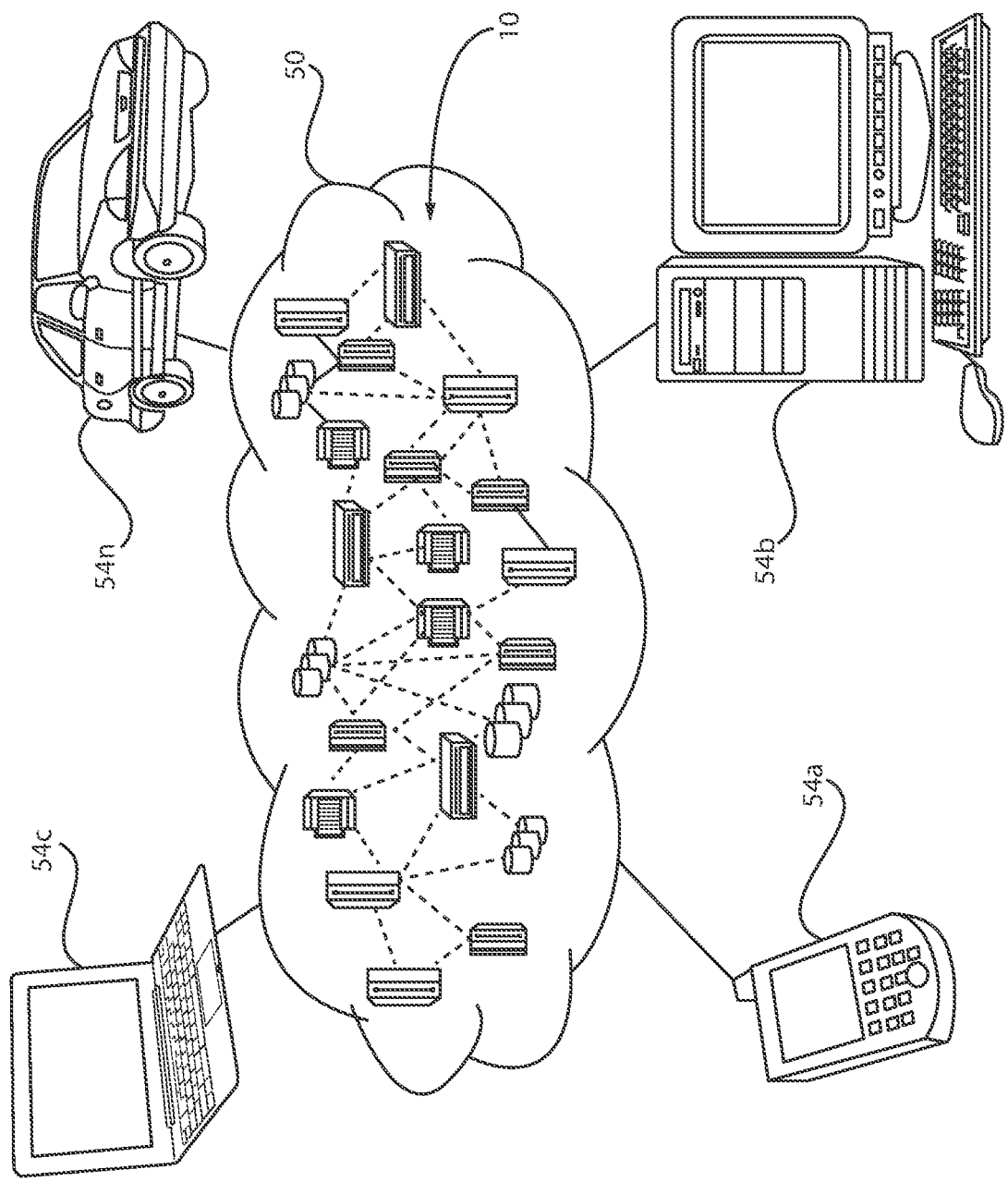
FIG. 10 is a block diagram showing an illustrative cloud computing environment having one or more cloud computing nodes with which local computing devices used by cloud consumers communicate in accordance with one embodiment.

Referring now to FIG. 10, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Figure 11:
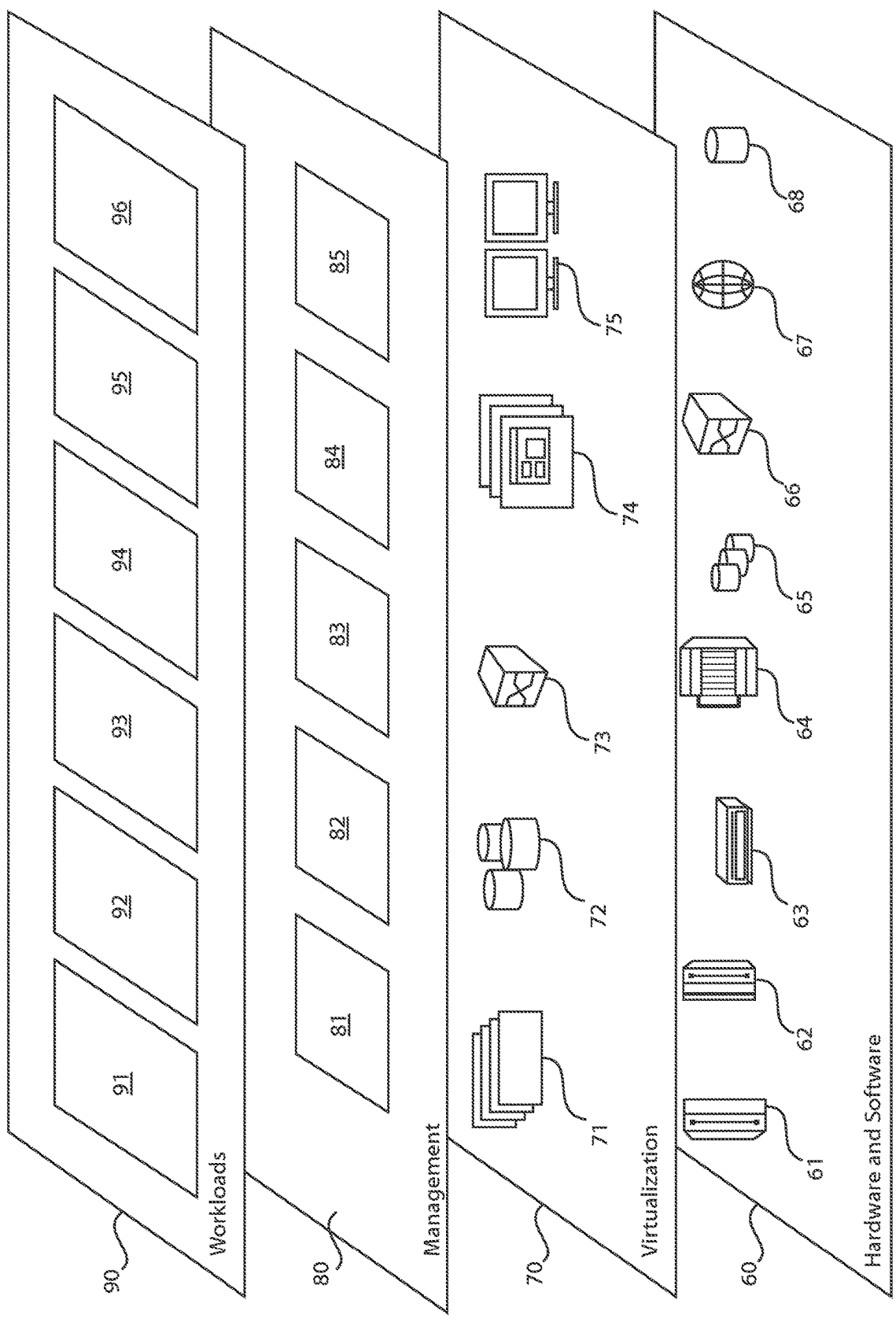
FIG. 11 is a block diagram showing a set of functional abstraction layers provided by a cloud computing environment in accordance with one embodiment.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the navigation system 350, which is described with reference to FIGS. 1-11.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a navigation method without map or global positioning system in underground of a building (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method of navigation comprising:
   building a virtual map database of maps for buildings that block GPS signals, wherein the virtual maps are created from speed and direction measurements taken from motion sensors of the mobile devices of users of a geographic information system (GIS) map server, the virtual maps employing the speed and direction measurements to determine a building type for internal layout, and entrance and exit points to the building are recorded by changes in GPS signals for mobile devices entering and existing the building;
   starting a navigation session by a user employing a navigation application that employs the GIS map server, wherein the GIS map server includes GIS map data, and virtual map data from the virtual map database, the virtual map data being for navigation instructions without a GPS signal;
   setting a start location using the GIS map data to provide a geometry for a no internal GPS data building of the buildings in the virtual map database that blocks GPS signals, and using a change in GPS signal to dictate an initial start location for entering the no internal GPS building;
   matching exterior dimensions measured from the GIS map data for the geometry for the no internal GPS data building to the buildings in the virtual map database that blocks GPS signals, wherein a floor plan from building in the virtual map database having a match for the exterior dimensions for the no internal GPS data building is fit to the entrance and exit points of the no internal GPS data building;
   providing directions from the start location using a virtual map data from the virtual map database, the virtual map data providing the exit points for the no internal GPS data building and using the internal layout determined using the floor plan from the building in the virtual map database having the match to provide navigation paths from the initial start location to the exit points;
   sensing strength of GPS signal; and
   switching between the virtual map database when the GPS signal is low and the GIS map data when the GPS signal is high to provide directions for said navigation.

2. The computer implemented method of claim 1, wherein building the virtual map comprises measuring a passageway using the motion sensor of the mobile devices of the users, the structures that block GPS being below ground.

3. The computer implemented method of claim 2, wherein the motion sensor of the mobile device was a gyroscope.

4. The computer implemented method of claim 1, wherein said virtual map database is populated by virtual maps created by multiple identity users.

5. The computer implemented method of claim 2, wherein the below ground structure is a parking garage.

6. The computer implemented method of claim 1, wherein said starting said navigation session comprises calling for a GPS signal using a mobile device.

7. The computer implemented method of claim 6, wherein the mobile device does not receive a GPS signal in response to said call for a GPS signal.

8. The computer implemented method of claim 7, wherein setting the start location using the GIS map data to provide the initial start location comprises setting the start location closest to the last known GPS coordinate.

9. The computer implemented method of claim 8, wherein the virtual map data is provided for an underground parking garage adjacent to the last known GPS coordinate provided for the initial start location.

10. The computer implemented method of claim 9, wherein providing directions to the start location using a virtual map data from the virtual map database.

11. A system for providing navigation directions that employs virtual maps to supplement navigation directions when the navigation application being employed by the user fails to receive a GPS signal comprising:
   a GPS signal transceiver for receiving GPS signals;
   a map server including a geographic information system (GIS) map database and a virtual map database, the virtual map database including map data for underground structures that block GPS signals, the virtual map data including speed and direction measurements for determining a building type for internal layout, and entrance and exit points to the building based upon changes in GPS signals for mobile devices entering and exiting the underground structure; and
   a navigation application including at least one hardware processor for executing directions stored on memory, the directions stored on the memory and executed by the navigation application including selecting a start location for a navigation session from a last known GPS location from the GIS map database when the navigation application fails to receive a GPS signal from the GPS signal transceiver, the navigation application matching exterior dimensions measured from the GIS map data for a geometry for a no internal GPS data building to the buildings in the virtual map database that blocks GPS signals, wherein a floor plan from building in the virtual map database having a match for the exterior dimensions for the no internal GPS data building is fit to the entrance and exit points of the no internal GPS data building, and selecting map data from the virtual map database to provide travel directions from the start location for the navigation session, the navigation application using the internal layout determined using the floor plan from the building in the virtual map database having the match to provide navigation paths from the initial start location to the exit point, the navigation application sensing strength of GPS signal, and switching between the virtual map database when the GPS signal is low and the GIS map data when the GPS signal is high to provide directions for said navigation.

12. The system of claim 11, wherein the system includes a mobile device for running the navigation application.

13. The system of claim 12, wherein the mobile device includes a display for displaying the travel directions to the start location for the navigation session.

14. The system of claim 13, wherein the map data from the virtual map database is a virtual pathway overlaid upon a GIS map to provide travel directions to the start location that are displayed on the display.

15. The system of claim 12, wherein the virtual maps are created from speed and direction measurements taken from motion sensors of the mobile devices.

16. A computer program product comprising a computer readable storage medium having computer readable program code embodied therein for a method of navigation that employs virtual maps to supplement navigation directions when the navigation application being employed by the user fails to receive a GPS signal, the method actuated by the computer program product comprising:

building a virtual map database of maps for buildings that block GPS signals, wherein the virtual maps are created from speed and direction measurements taken from motion sensors of the mobile devices of users of a geographic information system (GIS) map server, the virtual maps employing the speed and direction measurements to determine a building type for internal layout, and entrance and exit points to the building are recorded by changes in GPS signals for mobile devices entering and existing the building;

starting a navigation session by a user employing a navigation application that employs the GIS map server, wherein the GIS map server includes GIS map data, and virtual map data from the virtual map database, the virtual map data being for navigation instructions without a GPS signal;

setting a start location using the GIS map data to provide the initial start location;

matching exterior dimensions measured from the GIS map data for the geometry for the no internal GPS data building to the buildings in the virtual map database that blocks GPS signals, wherein a floor plan from building in the virtual map database having a match for the exterior dimensions for the no internal GPS data building is fit to the entrance and exit points of the no internal GPS data building;

providing directions from the start location using a virtual map data from the virtual map database, the virtual map data providing the exit points for the no internal GPS data building and using the internal layout determined using the speed and direction measurements to provide navigation paths from the initial start location to the exit points;

sensing strength of GPS signal; and switching between the virtual map database when the GPS signal is low and the GIS map data when the GPS signal is high to provide directions for said navigation.

17. The computer program product of claim 16, wherein building the virtual map comprises measuring a passageway using the motion sensor of the mobile devices of the users, the structures that block GPS being below ground.

18. The computer program product of claim 17, wherein the motion sensor of the mobile device was a gyroscope.

19. The computer program product of claim 18, wherein said virtual map database is populated by virtual maps created by multiple identity users.

20. The computer program product of claim 7, wherein the below ground structure is a parking garage.

* * * * *